(12) United States Patent
Lee et al.

(10) Patent No.: US 10,467,448 B2
(45) Date of Patent: Nov. 5, 2019

(54) SENSOR MODULE, SENSOR UNIT AND SYSTEM FOR RECOGNIZING SURROUNDING OBJECTS AND DEFINING AN ENVIRONMENT

(71) Applicant: PIXART IMAGING INC., Hsin-Chu (TW)

(72) Inventors: Tsung-Hsueh Lee, Hsin-Chu (TW); Chao-Chien Huang, Hsin-Chu (TW); Cheng-Lin Yang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 15/984,510

(22) Filed: May 21, 2018

(65) Prior Publication Data

US 2019/0156091 A1    May 23, 2019

Related U.S. Application Data

(60) Provisional application No. 62/588,156, filed on Nov. 17, 2017.

(51) Int. Cl.
| | |
|---|---|
| G06K 7/10 | (2006.01) |
| G06K 7/14 | (2006.01) |
| G06K 19/06 | (2006.01) |
| A63H 33/00 | (2006.01) |
| G01J 3/46 | (2006.01) |
| G01J 3/51 | (2006.01) |

(52) U.S. Cl.
CPC .......... *G06K 7/1417* (2013.01); *A63H 33/00* (2013.01); *G01J 3/46* (2013.01); *G01J 3/51* (2013.01); *G06K 7/10831* (2013.01); *G06K 7/1413* (2013.01); *G06K 19/06028* (2013.01); *G06K 19/06037* (2013.01)

(58) Field of Classification Search
CPC ... G06K 7/10722; G06K 7/14; G06K 7/10851
USPC ........................................................ 235/454
See application file for complete search history.

(56) References Cited

U.S. PATENT DOCUMENTS

| | | | | |
|---|---|---|---|---|
| 2009/0231582 | A1* | 9/2009 | Aebischer | G01C 15/002 356/364 |
| 2015/0115033 | A1* | 4/2015 | Hammer | G06K 7/10732 235/455 |
| 2017/0011243 | A1* | 1/2017 | Hammer | G02F 1/31 |
| 2018/0329024 | A1* | 11/2018 | Send | G01S 17/46 |

* cited by examiner

*Primary Examiner* — Ahshik Kim
(74) *Attorney, Agent, or Firm* — Li & Cai Intellectual Property (USA) Office (57) ABSTRACT

The disclosure is related to a sensor module, a sensor unit and a system for recognizing surrounding objects and defining an environment. The sensor module is installed in a sensor unit. The sensor module includes an optical element guiding the lights from the objects surrounding the sensor unit and to an image sensor, and the image sensor is used to sense the lights from the objects. The light can be directly from a light source inside the surrounding object or reflected by the object surface. The objects can be identified according to optical features obtained by the image sensor from surfaces of the objects. When the image sensor receives the two lights, guided by the optical element, and reads optical features being regarded as the unique IDs to identify the objects respectively. Therefore, an environment around the sensor unit can be defined.

20 Claims, 12 Drawing Sheets

SENSOR MODULE, SENSOR UNIT AND SYSTEM FOR RECOGNIZING SURROUNDING OBJECTS AND DEFINING AN ENVIRONMENT

CROSS REFERENCE TO RELATED APPLICATIONS

The present application relates to and claims priority of U.S. provisional patent application, Ser. No. 62/588,156, entitled "METHOD TO DETECT PATTERNS IN TWO PERPENDICULAR AREA," filed on Nov. 17, 2017. The disclosure of the Provisional Patent Application is hereby incorporated by reference in its entirety.

BACKGROUND OF THE INVENTION

1. Field of the Invention

The disclosure is generally related to a technology for recognizing surrounding objects, and in particular to a sensor module, sensor unit and system for recognizing surrounding objects through at least two different lights from different objects respectively.

2. Description of Related Art

People like to use props to describe some physical things. For example, an architect uses a model to show a building, and the model can be composed of some components, e.g. some building blocks. A strategist uses a terrain model which can be composed of various bricks to indicate his strategy. For the purpose of entertainment or education, especially in the childhood, the building blocks are one of the most popular toys that not only for entertainment, but also to inspire children's creativity. Some famous traders, such as Lego®, produce many types of building block toy sets for the children to create their own items.

The mentioned building blocks can be various colors, shapes and sizes of basic components. For example, the components are such as the simple cubes designed for stacking, arranging and interlocking so as to create a variety of things. The modern toy manufacturers have developed some kinds of smart blocks for creating interesting and educational things when the blocks can be electrically interconnected.

SUMMARY OF THE INVENTION

For further understanding of the instant disclosure, reference is made to the following detailed description illustrating the embodiments of the instant disclosure. The description is only for illustrating the instant disclosure, and not for limiting the scope of the claim.

In one aspect of the present disclosure, a sensor module is provided to be installed in an apparatus for identifying two or more surrounding objects. The sensor module preferably includes an optical element for guiding the lights from the surrounding objects, and an image sensor used to sense the optical features of the objects. In one aspect, the light module has a light-source module inside, for example including two light sources, that is used to emit the lights with at least two different wavelengths. The optical element is a device coated or mounted with an optical film that is characterized in reflecting a specific wavelength of light and simultaneously allowing passing another wavelength of light. The optical element is adopted in the sensor module for guiding the lights to the two or more objects surrounding the apparatus. The image sensor is used to sense the reflected lights with at least two different wavelengths from the objects surrounding the apparatus and identify the objects according to patterns imaged from their surfaces.

In another aspect, the lights are guided by the optical element and sensed by the image sensor can be directly emitted by the light sources inside the surrounding objects. Therefore, it is not necessary for the sensor module to dispose the light-source module.

Further, in another aspect of the present disclosure, the at least two light sources may be sequentially activated to emit the lights at different times, and the image sensor senses the lights in different time slots.

In an exemplary example, the optical feature indicates a pattern such as a barcode that can be imaged from one of the objects and used to be a unique ID to identify the corresponding object. When the objects surrounding the apparatus have been identified, a status such as a position, an angle and/or an orientation of the apparatus is well defined. Further, a combination of the apparatus and its surrounding objects defines a specific a gaming environment.

A sensor unit, in one further aspect of the present disclosure, includes a body having with several surfaces and a sensor module contained in the body. The sensor module essentially includes the optical device and an image sensor. The sensor unit can be defined when one of the objects mounted with the surface of the body has been identified. An environment with respect to the sensor unit can therefore be recognized when the objects surrounding to the sensor unit have been identified.

According to another aspect of the present disclosure, a system is provided. The system essentially includes a plurality of sensor units in which each of the sensor units includes a body with the surfaces, and the body contains a sensor module. The system defines an environment when the system well identifies the objects surrounding each of the sensor units.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, for ease of illustration, similar reference numbers or symbols refer to elements alike.

The present disclosure is generally related to a sensor module, a sensor unit including the sensor module, and a system thereof. The system having a plurality of sensor units can be used to recognize a plurality of surrounding objects and define an environment. For example, the sensor unit can be made as a building block. Every building block can be assigned with a specific attribute that can be recognized by a unique ID. Therefore, if a plurality of building blocks are piled up and each of that can be well identified, an environment having the building blocks can be defined accordingly.

Figure 1:
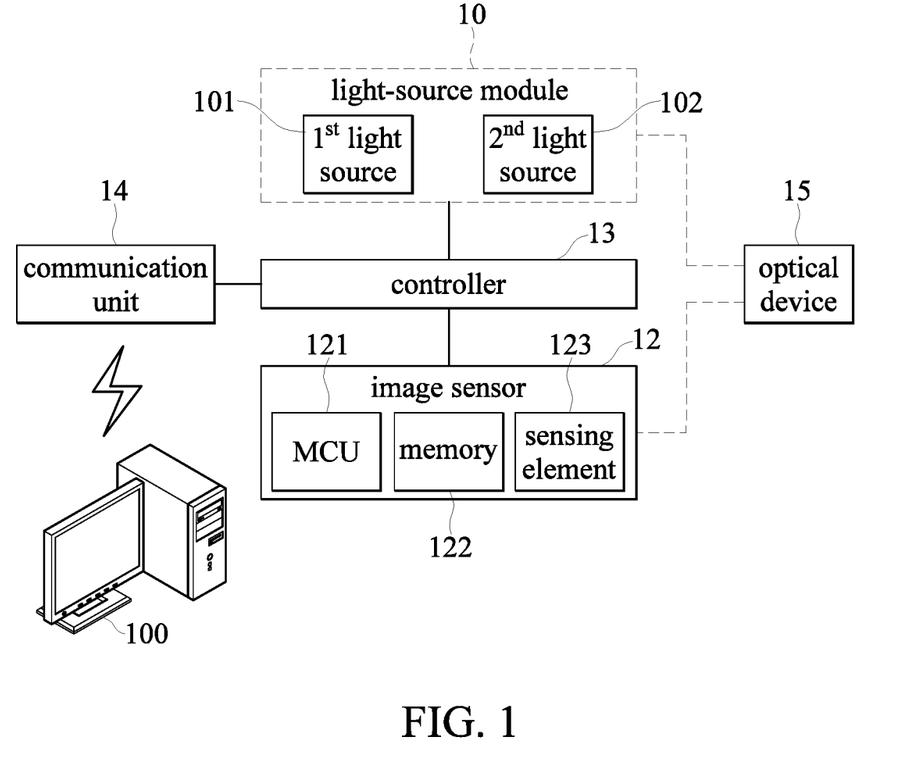
FIG. 1 shows a schematic block diagram illustrating main circuit units of a sensor module in one embodiment of the disclosure.

FIG. 1 shows a schematic block diagram illustrating main circuit units of a sensor module that can be installed in an apparatus according to one embodiment of the disclosure.

The sensor module shown in the diagram is provided to be installed in the apparatus that is capable of identifying two or more objects surrounding the apparatus. The sensor module includes a controller 13 for operating the sensor module to achieve the function of recognizing the objects by imaging their identifiable optical features, such as pattern or color. In one aspect, the sensor module uses a light-source module 10, operatively coupled with the controller 13, to emit at least two different wavelengths of lights. In an exemplary embodiment, the light-source module 10 has two light sources, e.g. a first light source 101 and a second light source 102, which can emit at least two lights with different wavelengths. In one further aspect of the invention, the light-source module 10 can use one light source to emit the lights with different wavelengths by means of modulation technology. The modulation scheme can periodically vary an output of the light source, for example to vary the wavelength of the light source. For example, the lights with different wavelengths could be generated though one or more color filters, and when a white light passes a specific color filter could generate light with corresponding wavelength.

The sensor module includes an optical element 15 that is an optical mechanism used to collect lights from different directions and guide the lights emitted to different directions if the sensor module is built with the light source. The optical element 15 guides lights with different wavelength to different paths.

For example, the two light sources (101, 102) of the light-source module emit two lights with different wavelengths to the optical element 15 in a same direction, and the lights are guided to two surrounding objects via two paths respectively.

In one embodiment, the optical element 15 is such as a device coated with specific materials or mounted with an optical film that is characterized in reflecting an incident light with a specific wavelength and simultaneously allowing passing a light with another specific wavelength. Therefore, when the optical element 15 adopted in the sensor module guides the lights to the two or more objects surrounding the apparatus, an image sensor 12 then senses the reflected lights from the surfaces of the objects. The image sensor 12 operatively coupled with the controller 13 is used to sense the reflected lights with at least two different wavelengths from the objects surrounding the apparatus and identify the objects according to optical features (ex: patterns or colors) imaged from their surfaces.

More specifically, the image sensor 12 includes an internal micro-processor control unit (MCU) 121 for processing the signals converted from the received light, a memory 122 for buffering the signals, and a sensing element 123 that is consisted of sensing pixels used to sense the reflected light and convert the photoelectrons to electronic signals. It should be noted that, for recognizing the objects surrounded the apparatus, the related identification information is stored to the memory 122, another memory inside the sensor module, or any storage of the apparatus including the sensor module. The MCU 121 processes the signals converted from the reflected lights and recognizes the signals based on the identification information stored in the memory 122 or the like. The two or more objects surrounding the apparatus can therefore be identified.

In another aspect of the present disclosure, the sensor module includes a communication unit operatively coupled with the controller 13, by which the sensor module can establish a connection with an external host 100 via a specific communication protocol. The host 100 can server a user to obtain the output of the sensor module. In an exemplary example, a program executed in the host 100 receives the outcomes of the sensor modules and defines an environment accordingly.

In an embodiment of the invention, inside the sensor module, the optical element 15 acts as a critical component for guiding the emitted lights to the objects around the sensor module and also guiding the lights reflected by the objects back to the image sensor 12. Specifically, the optical element 15 can be an optical-coating filter that allows the light with a specific frequency to pass through the filter and reflects the other one or more lights. Further, the optical element 15 can be a see-through mirror that allows one of the lights to pass through the mirror and reflects the other lights.

Furthermore, in one embodiment, it is not necessary for the sensor module to dispose the light-source module 10 since the lights can be directly made by the light sources disposed in the objects surrounding the apparatus.

Figure 2A:
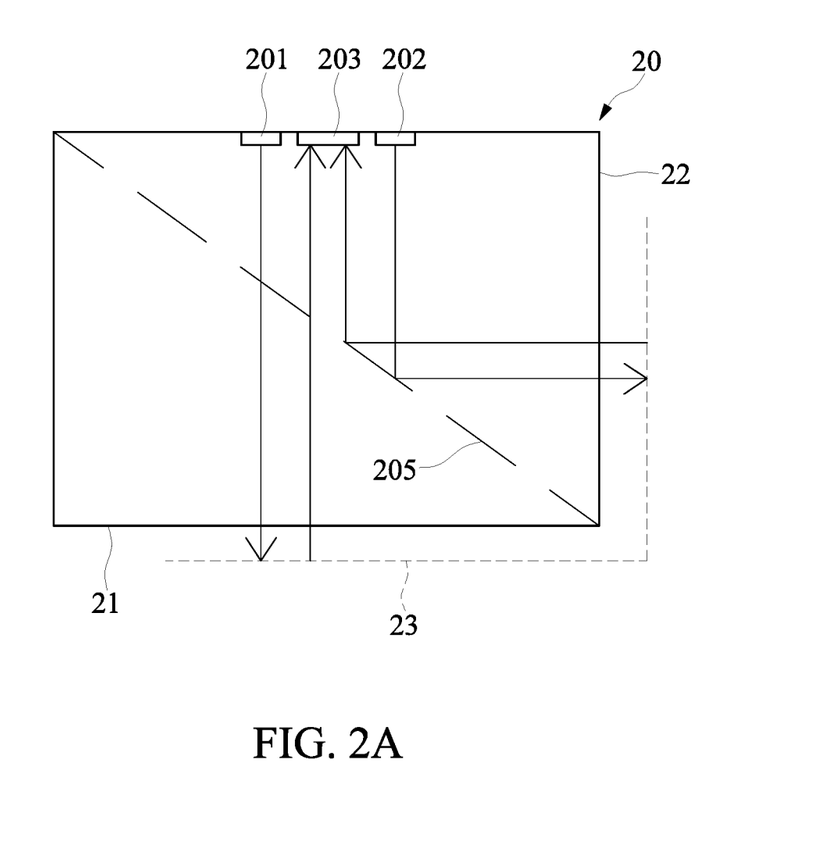
FIG. 2A shows a schematic diagram depicting a sectional view of a sensor unit with the sensor module according to one of the embodiments of the disclosure.

Further, in a schematic diagram of FIG. 2A, a sectional view of the sensor unit having the sensor module in one embodiment is shown. The sensor module of a sensor unit 20 shown in the diagram includes an image sensor 203, a first light source 201 and a second light source 202. An optical element 205 can guide the lights respectively to a first surface 21 and a second surface 22, and finally to the surface(s), e.g. the surface 23, of the other surrounding object(s).

Figure 2B:
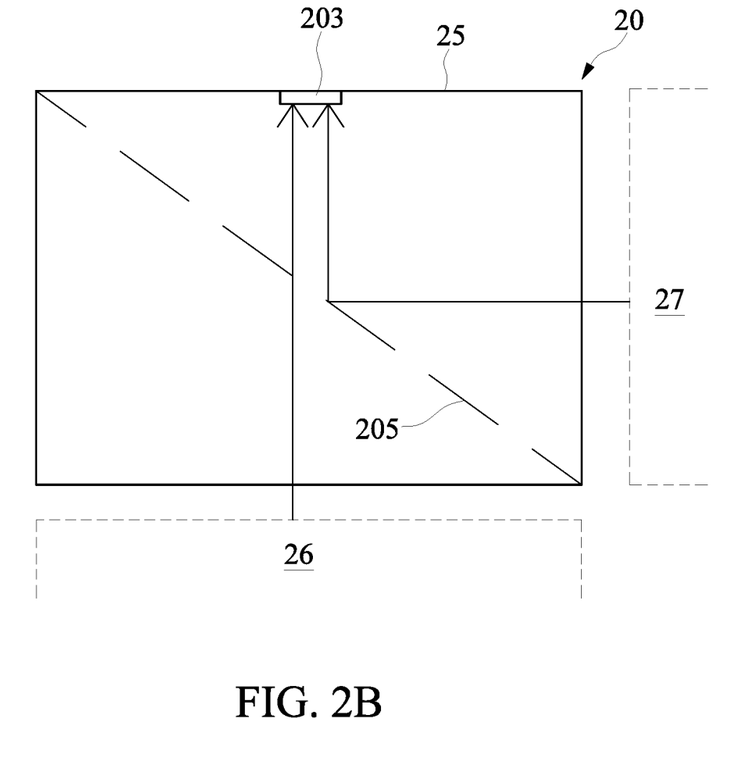
FIG. 2B shows another schematic diagram depicting another sectional view of the sensor unit according to another embodiment of the disclosure.

In FIG. 2B that shows another sensor unit according another embodiment of the disclosure. Another sensor unit 25 including the image sensor 203 is shown. Rather than the embodiment shown in FIG. 2A, this sensor unit 25 has no light source inside and the lights reaching the image sensor 203 are directly from the surrounding objects 26 and 27. In one embodiment, the object 26 or 27 has a light source disposed inside and used to emit the light carried with the information for identifying the object, e.g. the optical feature associated to this object. After that, the light from the object 26 or 27 is guided by the optical element to the image sensor 203 so as to identify the object 26 or 27 surrounding the sensor unit 25.

According to one embodiment of the disclosure, the object can be printed with a pattern, a specific color and/or a combination of colors correlated to the identification information of the object and the pattern is visible to the image sensor. The pattern indicates an attribute such as color, shape and/or size of the object, and the pattern imaged from one of the surrounding objects acts as a unique ID to identify the object. While the pattern is imaged by the image sensor, the object associated with this pattern can be recognized. For example, if the pattern is a barcode, a QR code or a dot-code matrix, the image sensor is such as a reader capable of recognizing the imaged barcode, QR code or dot-code matrix. When the objects surrounding the apparatus have been identified, a status of the apparatus is well defined.

Figure 3:
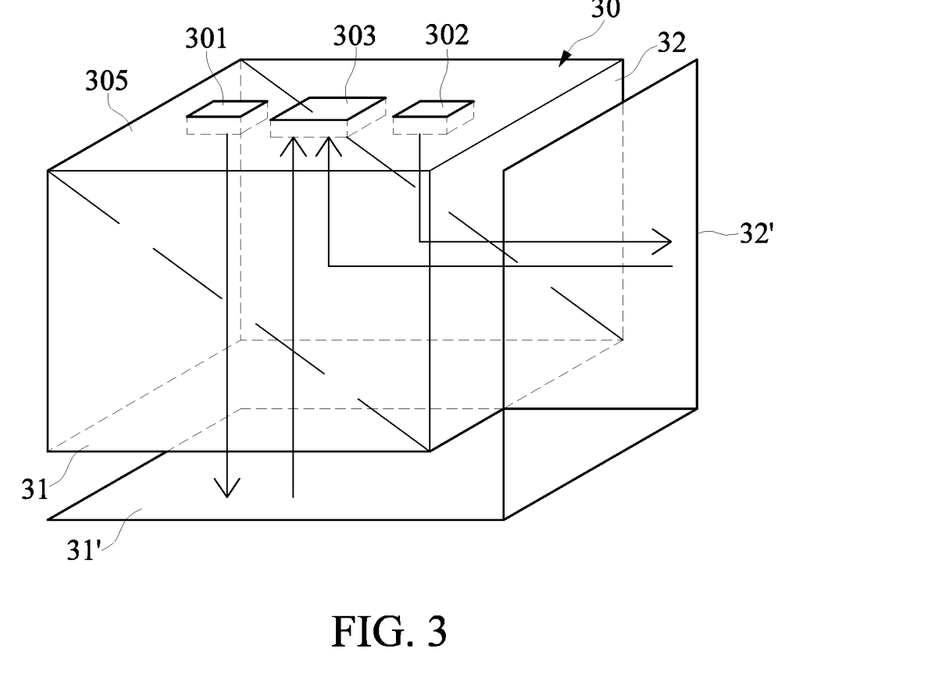
FIG. 3 shows a schematic diagram depicting a perspective view of a sensor unit with the sensor module according to another embodiment of the disclosure.

FIG. 3 further shows a schematic diagram depicting a perspective view of an apparatus 30, e.g. a cube. The apparatus 30 is such as a sensor unit in which an image sensor 303, a first light source 301 and a second light source 302 are included. The light emitted by the first light source 301 is allowed to pass through the optical element 305 and reach a first surface 31 of the apparatus 30. In the meantime, a pattern over a first corresponding surface 31' of the object next to the apparatus 30 is imaged by the incident light and read by the image senor 303 through the light reflected by the first corresponding surface 31'. The other light emitted by the second light source 302 is reflected by the optical element 15 with a tilt angle and reaches a second surface 32 of the apparatus 30. Similarly, another pattern over a second corresponding surface 32' of another object adjacent to the apparatus 30 is imaged and read by the image sensor 303 through the light reflected by the second corresponding surface 32'.

Figure 4:
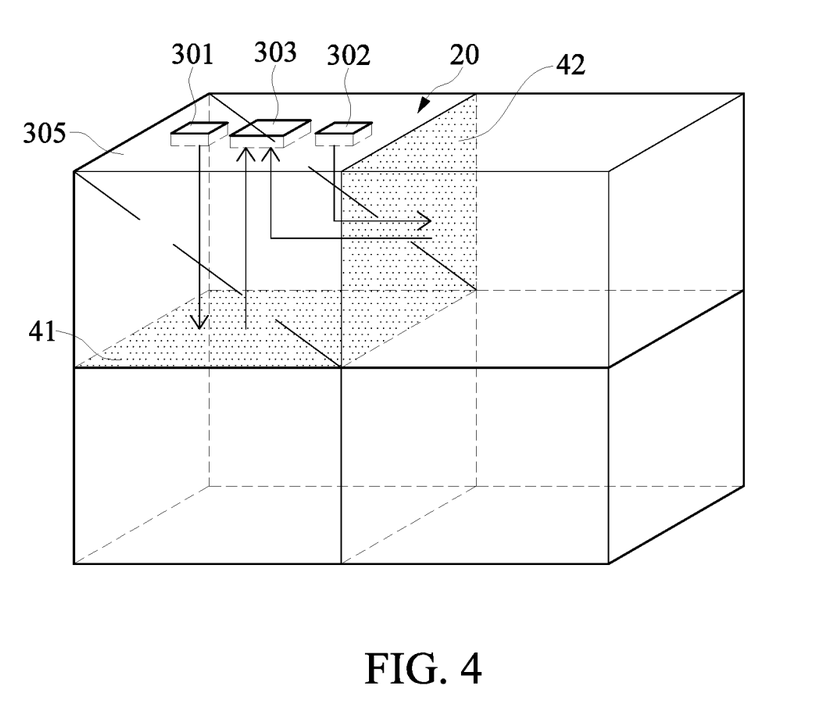
FIG. 4 shows a schematic diagram depicting a perspective view of the sensor unit with the sensor module according to another embodiment of the disclosure.

FIG. 4 schematically shows another perspective view of the sensor unit according to another embodiment of the disclosure. This schematic diagram exemplarily shows the apparatus 30 described in FIG. 3 configured to associate with its surrounding objects.

The apparatus 30 having the image sensor 303, the first light source 301 and the second light source 302 mounted in an environment schematically shown in the diagram. In the present example, the optical element 305 guides the lights respectively emitted by the first light source 301 and the second light source 302 to a first object surface 41 of an object and to a second object surface 42 of another object. The objects surround the apparatus 30 can be recognized by the sensor module inside the apparatus 30.

Through the above-described mechanism adopting an apparatus with the sensor module to recognize its surrounding objects, an environment including various interlocked objects can be well defined if a sufficient number of apparatuses are placed adequately in the environment.

In one further aspect of the present disclosure, provided is a system having a plurality of sensor units used to define an environment. The environment indicates one or a combination of a position and an orientation with respect to each of the sensor units of the system. Each of the sensor units within the environment of the system includes a body having at least two surfaces, and the surfaces of the other objects surrounded the sensor unit can be partially or fully printed with the patterns for identifying the objects. The body of the sensor unit contains the above-mentioned sensor module. While the system is in operation, the light-source module of the sensor module in every sensor unit emits lights with at least two different wavelengths, and the optical element in every sensor unit guides the lights to the at least two surfaces of the surrounded objects. In an exemplary example, the lights emits to a first object mounted at one surface of the body and a second object mounted at another surface of the body. The image sensor in every sensor unit senses the lights reflected from the first object and the second object. The first object and the second object can be identified according to patterns imaged respectively from the first object and the second object. It is noted that the sensor unit is well defined when the first object and the second object mounted with the surfaces of the body has been identified. The system therefore defines the environment when the system well identifies the objects surrounding each of the sensor units.

Figure 5A:
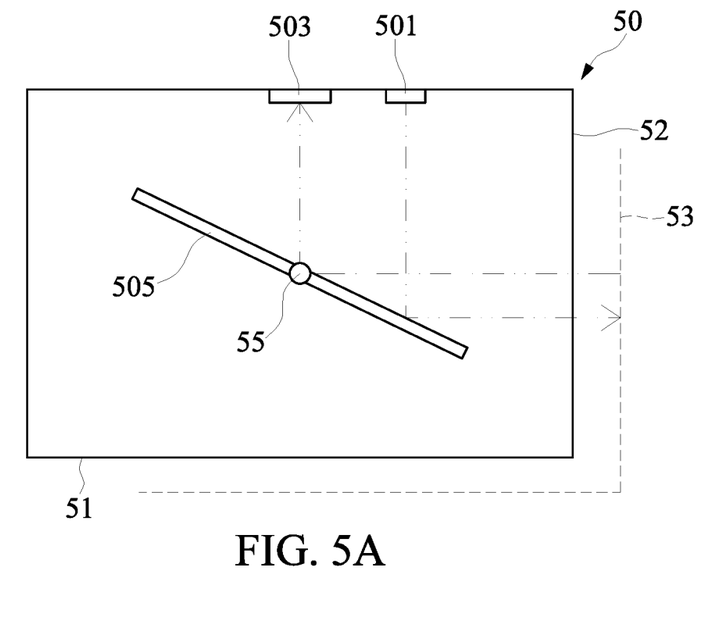
FIG. 5A and FIG. 5B show the schematic diagrams depicting a sectional view of a sensor unit with a rotatable optical element of a sensor module according to one further embodiment of the disclosure.
Figure 5B:
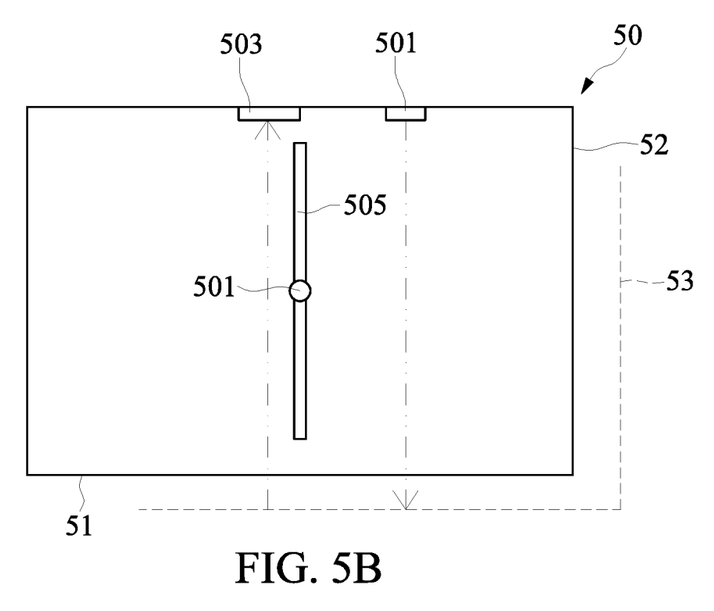

FIG. 5A and FIG. 5B show the schematic diagrams depicting a sectional view of a sensor unit with a rotatable optical element of a sensor module according to one further embodiment of the disclosure. The optical element in this embodiment is such as a rotatable mirror that is able to reflect the lights to different objects surrounding the apparatus. It is noted that the rotatable mirror can be a MEMS (Micro Electro Mechanical Systems) mirror.

In FIG. 5A or FIG. 5B, a sensor unit 50 is provided. The sensor unit 50 includes a sensor module that has an image sensor 503 and a light-source module with a light source 501. In the aspect of the present disclosure, in addition to adopting two or more light sources in the senor module, only one light source, e.g. 501, can also be used to emit the lights with at least two different wavelengths by the modulation technology. A rotatable optical element 505 is particularly provided in the present embodiment of the disclosure.

One surface of the rotatable optical element 505 can be coated with a reflective material as a rotary mirror. The rotatable optical element 505 has a rotary axle 55 that is fixed in the sensor unit 50. The rotary axle 55 is controlled by a controller, e.g. the controller 13 of FIG. 1, for driving the rotatable optical element 50 to be rotated periodically. On the other hand, the light-source module is also under control of the controller to alternately drive the light source to emit the lights with different wavelengths. While synchronizing the actions of the rotatable optical element 50 and the light-source module, the lights emitted by the light source can accurately irradiate the specified surfaces at different times.

In the present example shown in FIG. 5A, the light source of the light-source module emits a first light to a first surface 51 at a first time when the rotatable optical element 50 stays a vertical angle. In FIG. 5B, the light source emits a second light to a second surface 52 at a second time when the rotatable optical element 50 turns to a position with a tilt angle. Finally, the lights irradiating the surface 53 of the other object can be accurately reflected to the image sensor 503 of the sensor unit 50 by the mechanism of rotatable optical element 505.

Figure 6:
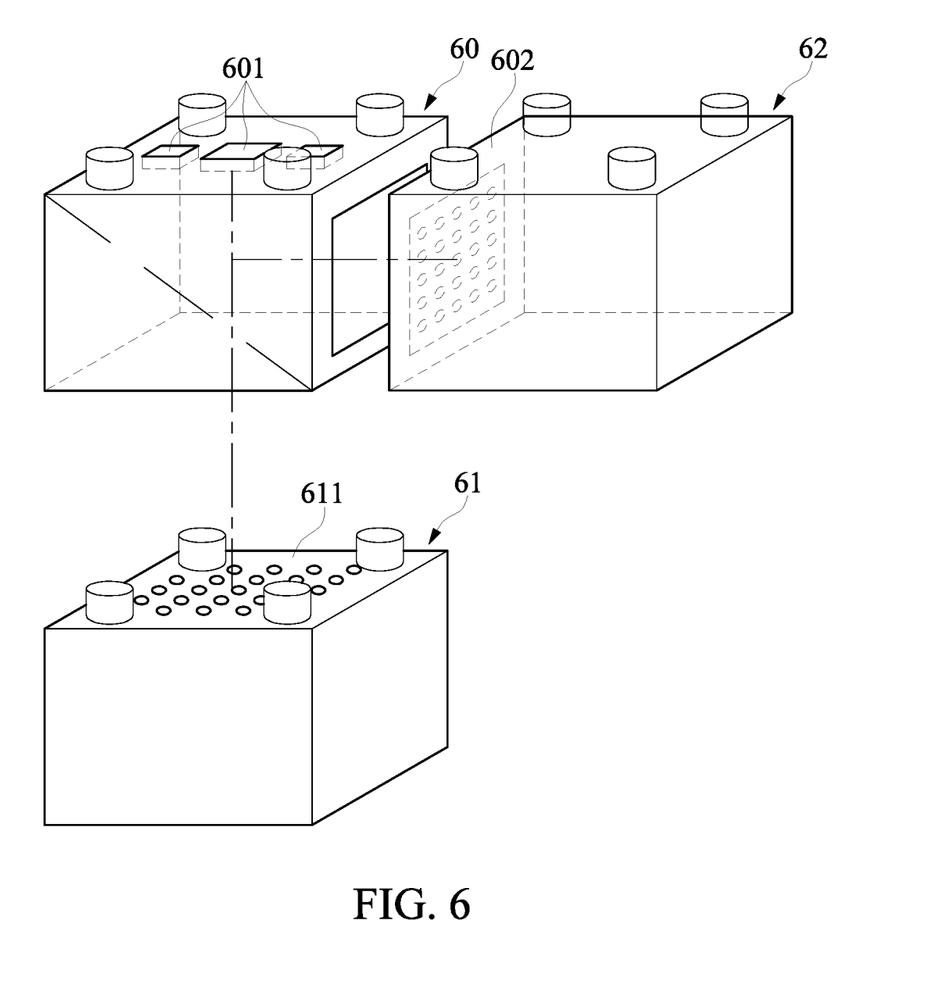
FIG. 6 shows a schematic diagram depicting an environment having a sensor unit and other objects in one embodiment of the disclosure.

FIG. 6 shows a schematic diagram depicting an environment having a sensor unit and other objects in one embodiment of the disclosure.

The apparatus 60 shown in the diagram also includes the sensor module 601 essentially having the light-source module, the light source and the optical element. The apparatus 60 is such as a basic component of a whole system. For example, the apparatus 60 is a cube that can be interlocked with other objects around the cube. A first object 60 interlocks the bottom surface with pluggable structures of the apparatus 60 through corresponding surface protrusions. In the present example, a top-side first object surface 611 of the first object 61 is printed with an identifiable pattern, e.g. QR code. The pattern over the first object surface 611 of the first object 61 can be read and identified by the sensor module of the apparatus 60.

On the other side, a second object 62 positioned at the right side of the apparatus 60 is presented. Similarly, a left-side second object surface 621 of the second object 62 is printed with a pattern used to identify the attribute of this second object 62. The sensor module of the apparatus 60 emits the light to the second object surface 621 and read the reflected light therefrom. The image imaged by the image sensor of the apparatus 60 can be processed for identify the second object 62. To sum up the information read from both the first object 61 and the second object 62, the program executed in the apparatus 60 can define its status and the related environment.

According to one further embodiment in view of FIG. 2B, it is not necessary for the sensor module 601 of the apparatus 60 to dispose any light source, and the lights can be directly from its surrounding objects 61 and 62. That is, the apparatus 60 can use the light that is emitted by the light source of the first object 61 or the second object 62 and guided by the optical element sensed by the image sensor of the sensor module 601 to identify the first object 61 or the second object 62.

When the apparatus with the sensor module is disposed in an environment, the environment having this apparatus can be defined once the apparatus can recognize two or more surrounding objects by means of the above scheme. Furthermore, if the environment includes a sufficient amount of the apparatuses and each of that has the sensor module, the environment can be more accurately defined since more objects in the environment can be recognized by the apparatuses.

According to the above-described embodiments, the optical element is such as an optical-coating filter characterized in that it allows a light with a specific frequency to pass through, but also acts as a mirror to reflect the other light with a different frequency. Therefore, the image sensor of the sensor module can be adapted to sensing the lights with two or more different wavelengths.

Figure 7:
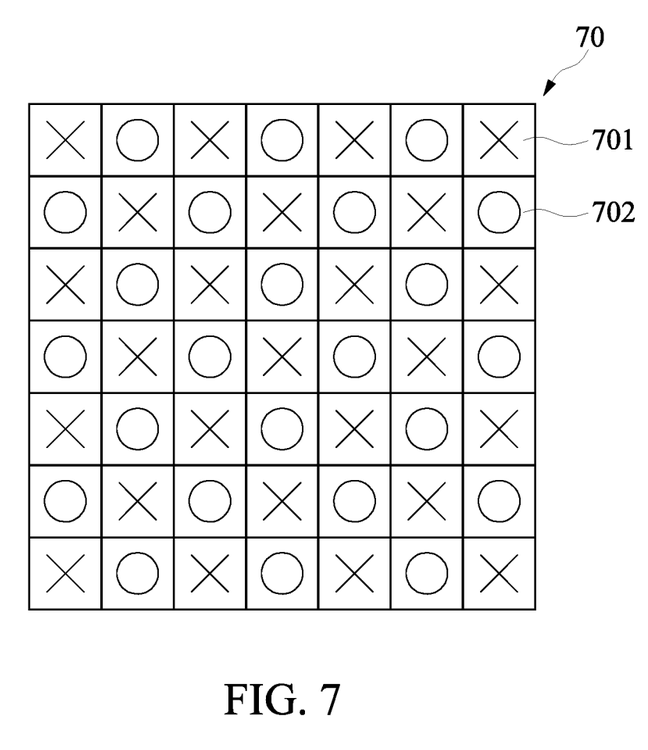
FIG. 7 shows a schematic pattern describing a sensing element with a photo sensor array in one embodiment of the disclosure.

Reference is made to FIG. 7 that shows a schematic pattern describing a sensing element with a photo sensor array in one embodiment of the disclosure. It is noted that the photo sensor array is consisted of a plurality of sensor pixels that can be fully or partially activated to work.

A sensing element 70 with a photo sensor array is provided. In the schematic diagram, a first set photo sensors 701 labeled as 'X' and a second set of photo sensors 702 labeled as 'O' over the surface of the sensing element 70 are interweaved. In one embodiment of the present disclosure, the first set of photo sensors 701 are enabled to sense the incident light reflected by the surface of one of the objects surrounding the apparatus, and the second set of photo sensors 702 are enabled to sense the light reflected by the surface of another object surrounding the apparatus. By this scheme, at least two objects surrounded the apparatus can be recognized when the lights with the same or different wavelengths are emitted by the light source(s) at the same time.

However, the type of the sensing element 70 can be designed based on requirement of the whole system and is not limited to the above embodiment. For example, the sensing element 70 can identify the different objects around the sensor unit when the sensor pixels of the sensing element 70 are periodically activated together to sense the incoming lights with the same frequency at different time slots.

In addition to the above embodiment, it should be noted that the lights sensed by the image sensor may be the same frequency if they are alternately emitted by the light source(s), and the objects can also be recognized by the image sensor because the rotational angle conversion of the rotatable optical element exemplarily shown in FIG. 5A is synchronized with the light source(s).

Figure 8:
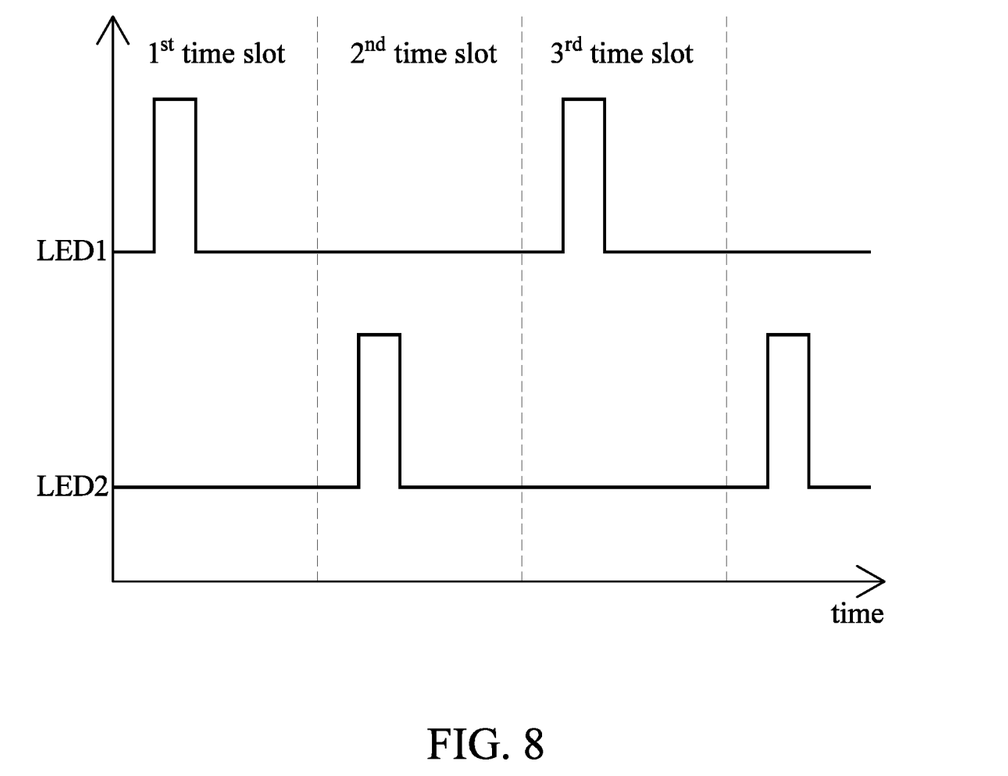
FIG. 8 shows a time line describing timing to alternately enable two light sources in one embodiment of the disclosure.

The light sources can be alternately enabled to emit the sensing lights, and a reference is made to FIG. 8. FIG. 8 shows a time line describing timing to alternately enable two light sources to emit lights with the same or different wavelengths according to one further embodiment of the disclosure.

This time line diagram shows the pulse signals to periodically activate two light sources such as an LED 1 and an LED 2 installed in one sensor unit of the apparatus. Specifically, the LED 1 and LED 2 are alternately turned on and off for periodically emitting the sensing lights to the surfaces of objects around the sensor unit. For example, the LED 1 and LED 2 indicate the at least two light sources that are sequentially activated to emit the lights at different times, e.g. $1^{st}$, $2^{nd}$ and $3^{rd}$ time slots, and the image sensor besides the light sources senses the reflected lights in the different time slots. By this scheme, the objects surrounded the apparatus can be recognized even though the wavelengths of the lights emitted by the LEDs are the same.

Figure 9:
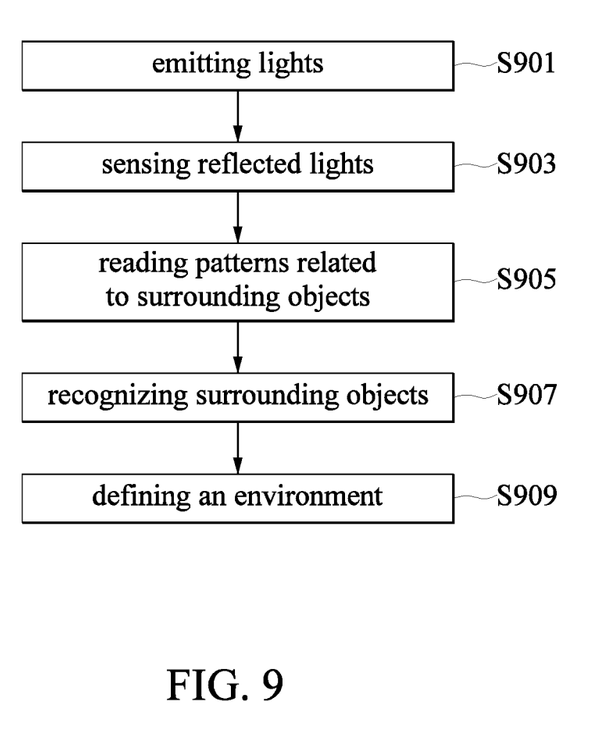
FIG. 9 shows a flow chart illustrating a process for operating the sensor module to recognizing surrounding objects and defining an environment according to one of the embodiments of the disclosure.

FIG. 9 shows a flow chart illustrating a process for operating the sensor module to recognizing surrounding objects and defining an environment according to one of the embodiments of the disclosure.

In the process for defining the environment having the plurality of objects, such as in step S901, the light source in one or more sensor units is activated to emit lights to irradiate the surfaces of the objects. The sensor unit and its surrounded object(s) are exemplified as a plurality of building blocks, and each of that may include the sensor module with a light source used to identify its surrounded blocks. The sensor unit emits the lights for identifying the objects around it. In an exemplary example shown in FIG. 10, the mentioned sensor unit can be one or any one of the building blocks constituting an item, e.g. a toy. The building blocks are such as multiple types of blocks with various colors, shapes and sizes forming the basic components, e.g. the blocks 109, 110, 111 and 112 of FIG. 10, that can be interconnected by a standardized connective mechanism.

By means of the above-described sensor module that is installed in the sensor unit for identifying two or more surrounding objects, an adequate number of sensor units with the sensor modules are provided in the item can sufficiently identify the objects in an environment. The object can be identified by one or more identifiable patterns on its surface(s). In step S903 of FIG. 9, a light-source module of the sensor unit emits at least two lights with the same or different wavelengths to the surfaces of its surrounding objects via an optical element, and an image sensor of the sensor unit senses the lights reflected by the surfaces. In the example shown in FIG. 10, the building block 110 can act as a sensor unit in the toy. By the sensor module, the building block 110 emits a light to the building block 109. In step S905 of FIG. 9, an image sensor of the sensor unit reads a pattern related to its surrounding object, and in step S907 for recognizing the object. In the present example, the image sensor of the sensor module in the building block 110 senses its reflected light for identifying the building block 109. Therefore, a relationship between the building blocks 109 and 110 can be defined according to the predetermined identification information that forms a database recorded in a memory. Similarly, the building block 110 also emits a light to the building block 111 and senses its reflected light so as to identify the building block 111. Another relationship between the building blocks 110 and 111 can also be defined according to the predetermined identification information there-between.

Figure 10:
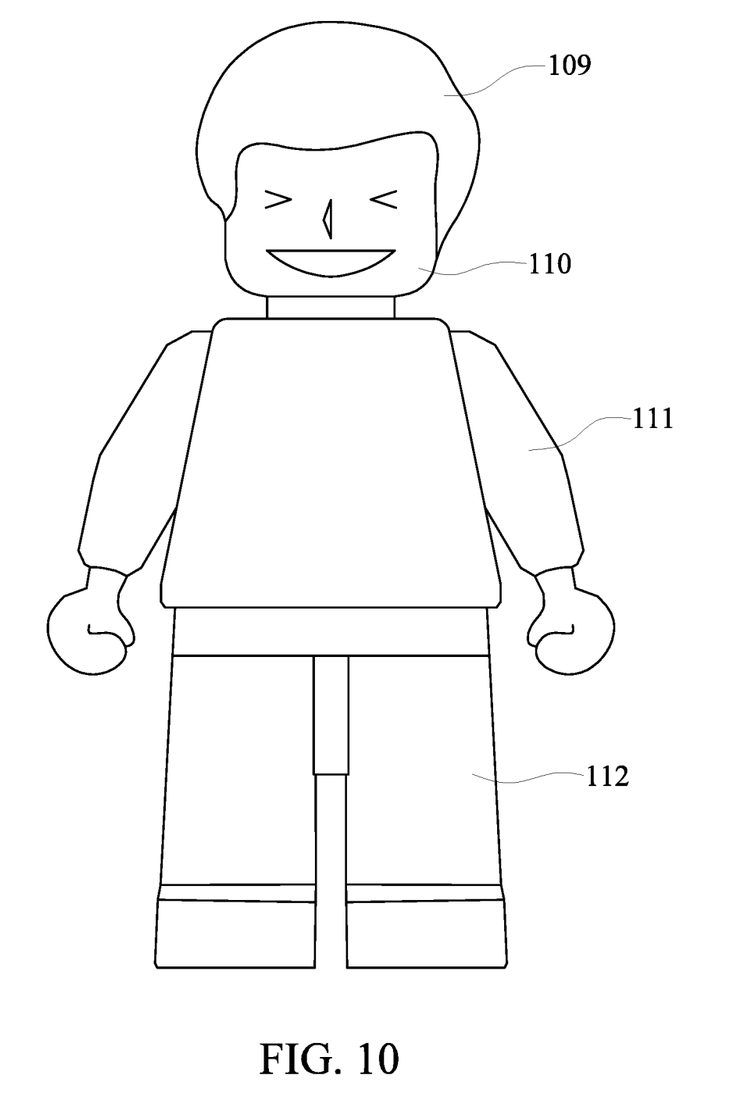
FIG. 10 shows a schematic diagram depicting a sensor unit mounted in an article for defining an environment thereof in one embodiment of the disclosure.

After that, such as in step S909, when the essential sensor units in the environment have been well identified, the environment can be defined. In the present invention, if the adequate number of building blocks of the item exemplarily shown in FIG. 10 are identified, this item can be well defined, e.g. a human-like toy.

Figure 11:
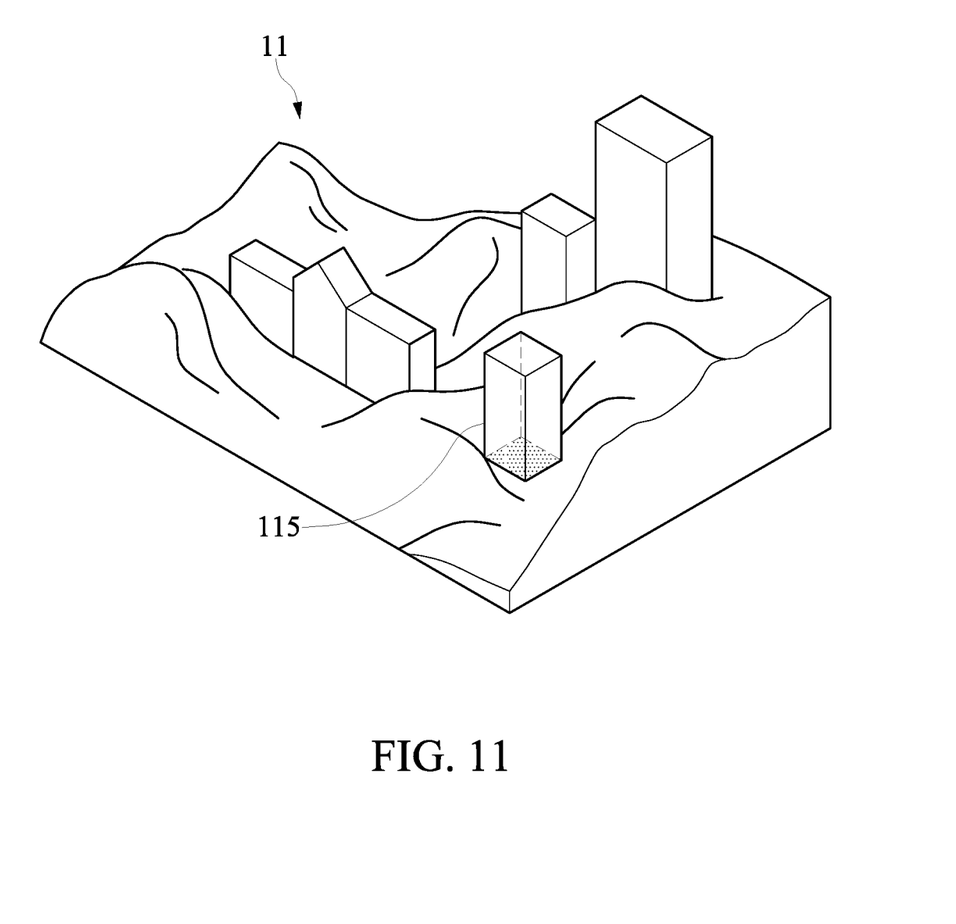
FIG. 11 shows another schematic diagram depicting a sensor unit mounted within a circumstance for defining an environment thereof in another embodiment of the disclosure.

FIG. 11 shows another schematic diagram depicting a sensor unit mounted within a circumstance for defining an environment thereof in another embodiment of the disclosure.

An area 11 with various terrains is shown. A plurality of object can be set up in the area 11 so as to form a specific environment. The objects can be identified with each other according the predetermined identification information that records the relationship between the objects. A sensor module including the light-source module having at least two light sources and the image sensor may be installed in some essential objects. For example, a sensor unit 115 placed at a specific location of the area 11 can be used to identify its surrounded items. The identified items surrounding the sensor unit 115 are able to define the status including a position, an angle and/or an orientation of the sensor unit. When the sensor unit 115 reads a pattern imaged by the light reflected by a ground, it can be defined as a building of the area 11 according to the identification information. It should be noted that the pattern indicates an attribute of the corresponding object. Since the plurality of patterns imaged from the objects around the area 11 act as the unique IDs corresponding to the objects, an environment can be defined.

In an exemplary example, the area 11 can be exemplified as a gaming environment, when every object and its surrounding objects can be identified, it means these objects define this gaming environment. After that, if the status including a position, an angle and/or an orientation of any object is changed, e.g. the object is removed or added, an updated status can be recognized and the gaming environment is re-defined.

To sum up the above-described embodiments, the sensor unit that forms an apparatus is disclosed. The sensor unit includes a body having at least two surfaces, by which the surface can be mounted with another object. The sensor unit includes a sensor module contained in the body, and the sensor module acts as a critical element in the invention that emits lights with at least two wavelengths, uses the optical element to guide the lights to the at least two surfaces, and senses the light reflected from the object so as to identify the object according to the pattern imaged from the object. Therefore, the sensor unit can be well defined when its surrounding object mounted with its surface of the body has been identified. This aspect of the invention allows an environment with respect to the sensor unit to be recognized when the one or more objects surrounding to the sensor unit have been identified.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A sensor module that is installed in an apparatus for identifying two or more surrounding objects, comprising:
    an optical element that is an optical-coating filter that allows a light with a specific frequency to pass through the optical-coating filter and reflects other one or more lights so as to guide the lights from the two or more objects surrounding the apparatus;
    an image sensor that senses the lights with at least two wavelengths guided by the optical element from the two or more surrounding objects so as to identify the two or more objects according to optical features obtained from surfaces of the two or more objects; and
    a light-source module with at least two light sources that respectively emit at least two lights with different wavelengths to the optical element, wherein the at least two light sources are sequentially activated to emit the lights at different times, and the image sensor senses the reflected lights in different time slots.

2. The sensor module according to claim 1, wherein one of the optical features is a pattern imaged from one of the objects acts as a unique ID to identify the corresponding object.

3. The sensor module according to claim 2, wherein the pattern is a barcode, a QR code or a dot-code matrix.

4. The sensor module according to claim 3, wherein the pattern indicates an attribute of the corresponding object.

5. The sensor module according to claim 4, wherein, when the objects surrounding the apparatus have been identified, a status of the apparatus is determined.

6. The sensor module according to claim 5, wherein the identified objects surrounding the apparatus define the status including a position, an angle and/or an orientation of the apparatus.

7. The sensor module according to claim 6, wherein a combination of the apparatus and its surrounding objects defines a specific a gaming environment.

8. A sensor module that is installed in an apparatus for identifying two or more surrounding objects, comprising:
    an optical element that guides lights from the two or more objects surrounding the apparatus;
    an image sensor that senses the lights with at least two wavelengths guided by the optical element from the two or more surrounding objects so as to identify the two or more objects according to optical features obtained from surfaces of the two or more objects; and
    a light source disposed in one of the surrounding objects, wherein one of the lights being guided by the optical element to the image sensor is emitted by the light source.

9. The sensor module according to claim 8, wherein the optical feature is a pattern imaged from one of the objects acts as a unique ID to identify the corresponding object.

10. The sensor module according to claim 9, wherein the pattern is a barcode, a QR code or a dot-code matrix.

11. The sensor module according to claim 10, wherein the pattern indicates an attribute of the corresponding object.

12. The sensor module according to claim 11, wherein, when the objects surrounding the apparatus have been identified, a status of the apparatus is determined.

13. The sensor module according to claim 12, wherein the identified objects surrounding the apparatus define the status including a position, an angle and/or an orientation of the apparatus.

14. The sensor module according to claim 13, wherein a combination of the apparatus and its surrounding objects defines a specific a gaming environment.

15. A sensor unit, comprising:
a body having at least two surfaces, in which a first surface is mounted with a first object; and
a sensor module contained in the body, wherein the sensor module comprises:
an optical element that guides lights from the at least two surfaces, wherein one of the lights is from the first object; and
an image sensor that senses the light from the first object so as to identify the first object according to an optical feature of the first object.

16. The sensor unit according to claim 15, wherein the body includes a second surface that is mounted with a second object; the image sensor senses the light from the second object so as to identify the second object according to another optical feature of the second object; and an environment with respect to the sensor unit is recognized when the first object and the second object surrounding to the sensor unit have been identified.

17. The sensor unit according to claim 16, wherein the sensor module further comprises a light-source module with at least two light sources that respectively emit at least two lights with different wavelengths to the optical element and reaching the first object and the second object.

18. A system, comprising:
a plurality of sensor units wherein each of the sensor units includes a body having at least two surfaces, and the body contains a sensor module comprising:
an optical element that guides lights from the at least two surfaces, wherein the lights are from a first object mounted at one surface of the body and a second object mounted at another surface of the body; and
an image sensor that senses the lights from the first object and the second object so as to identify the first object and the second object according to optical features obtained respectively from the first object and the second object.

19. The system according to claim 18, wherein the system defines an environment when the system identifies the objects surrounding each of the sensor units.

20. The system according to claim 19, wherein the environment indicates one or a combination of a position and an orientation with respect to each of the sensor units.

* * * * *